(12) United States Patent
Ziegner

(10) Patent No.: US 6,840,049 B2
(45) Date of Patent: Jan. 11, 2005

(54) GAS TURBINE AND METHOD FOR OPERATING A GAS TURBINE

(75) Inventor: Manfred Ziegner, Mülheim A.D. Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/333,216

(22) PCT Filed: Jul. 6, 2001

(86) PCT No.: PCT/DE01/02526
§ 371 (c)(1),
(2), (4) Date: Aug. 8, 2003

(87) PCT Pub. No.: WO02/08592
PCT Pub. Date: Jan. 31, 2002

(65) Prior Publication Data
US 2004/0040309 A1 Mar. 4, 2004

(30) Foreign Application Priority Data
Jul. 21, 2000 (DE) .......................... 100 35 676

(51) Int. Cl.[7] .............................. F02C 7/18; F02C 3/16; F23R 3/34
(52) U.S. Cl. ............................. 60/782; 60/735; 60/737; 60/752; 60/757; 60/806
(58) Field of Search ................... 60/735, 736, 752–760, 60/806, 737, 782

(56) References Cited

U.S. PATENT DOCUMENTS

| 2,647,368 | A | * | 8/1953 | Triebbnigg et al. ............ 60/735 |
| 2,653,446 | A | * | 9/1953 | Price ............................ 60/735 |
| 2,671,314 | A | | 3/1954 | Lichty |
| 3,623,317 | A | | 11/1971 | Foster-Pegg |
| 3,740,948 | A | | 6/1973 | Kellett |
| 4,112,676 | A | * | 9/1978 | DeCorso ....................... 60/733 |
| 5,216,876 | A | * | 6/1993 | Gabrielson et al. ............ 60/772 |
| 5,490,376 | A | * | 2/1996 | Van Der Burgt .............. 60/776 |
| 5,918,466 | A | * | 7/1999 | Cloyd et al. .................. 60/735 |
| 5,987,876 | A | * | 11/1999 | Ziegner ....................... 60/806 |
| 6,003,297 | A | * | 12/1999 | Ziegner ....................... 60/776 |
| 6,209,325 | B1 | * | 4/2001 | Alkabie ....................... 60/737 |

FOREIGN PATENT DOCUMENTS

| DE | 876936 C | 11/1953 |
| DE | 4330613 A | 3/1995 |
| DE | 19604416 A | 8/1997 |
| GB | 759251 | * 10/1956 |

* cited by examiner

Primary Examiner—Ted Kim
(74) Attorney, Agent, or Firm—Harness, Dickey & Pierce, P.L.C.

(57) ABSTRACT

The invention relates to a gas turbine (3) with reheat in the turbine section (11), whereby a fuel injection device (37) is provided for the injection of fuel (33) in to a combustion air flow (61) in the direction of flow before a cooling air flow (65) branching. By means of the early mixing of fuel (63) in the combustion air flow (61) and concomitant additional use of the cooling air flow (65) as combustion air, the specific output and the efficiency of the gas turbine (3) are improved.

30 Claims, 1 Drawing Sheet

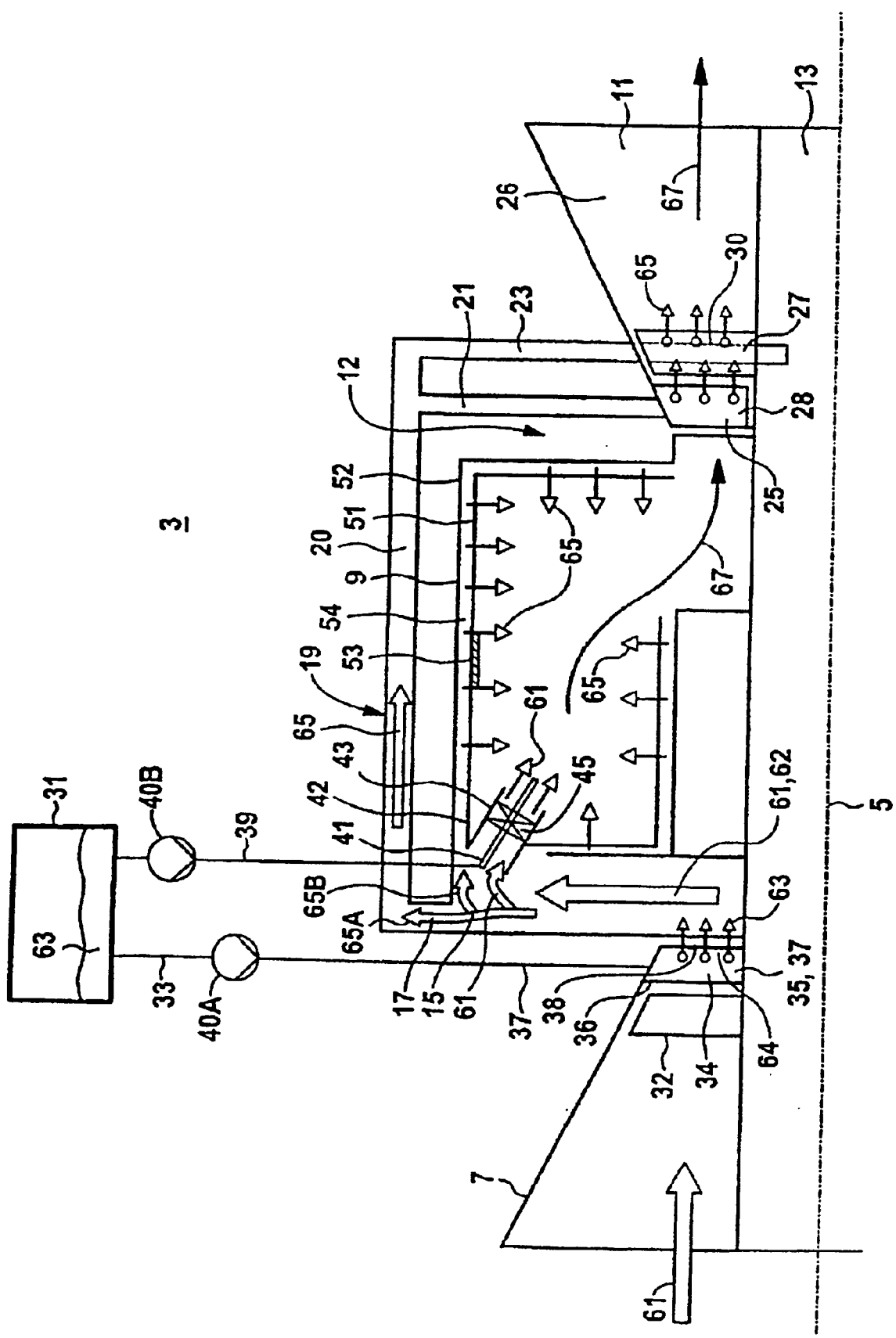

GAS TURBINE AND METHOD FOR OPERATING A GAS TURBINE

This application is the national phase under 35 U.S.C. § 371 of PCT International Application No. PCT/DE01/02526 which has an International filing date of July 6, 2001, which designated the United States of America and which claims priority on German Patent Application number DE 100 35 676.1 filed Jul. 21, 2000, the entire contents of which are hereby incorporated herein by reference.

FIELD OF THE INVENTION

The invention generally relates to a gas turbine having a compressor, a combustion chamber and a turbine part. It preferably relates to one having a cooling air supply system for branching off a cooling air flow from a combustion air flow and supplying this cooling air flow to a thermally stressed component. The invention also generally relates to a method for operating a gas turbine.

BACKGROUND OF THE INVENTION

DE 43 30 613 A1 discloses a method and an appliance for operating a gas turbine. The gas turbine has a turbine part through which a driving gas flows, while expanding and delivering mechanical work. A fuel, which is burnt in the turbine part, is supplied to the driving gas. The fuel for combustion in the turbine part is admixed to a cooling air flow which is to be supplied to this turbine part. The proportion of the fuel in the cooling air flow is dimensioned in such a way that any self-ignition of the mixture is excluded.

WO 97/29274 shows a method for expanding a combustion gas flow in a turbine and also shows a corresponding turbine. A thermally highly stressed component of the turbine is cooled by means of an associated cooling gas flow, which flows through the component and is supplied from this component to the combustion gas flow. Fuel is additionally metered to the combustion gas flow in the turbine in such a way that compensation is provided for a temperature reduction in the combustion gas flow is compensated by combustion of the additionally metered fuel. The temperature reduction is the result of the cooling gas flow being supplied without fuel being metered to it. The power of the turbine is increased by the additional combustion of fuel without the temperature of the combustion gas having to rise at inlet to the turbine.

For similar turbine design and for similar selection of the materials used in its construction, the useful work delivered by a gas turbine, to which the turbine belongs, is therefore substantially increased. This also avoids the combustion gas flow being further cooled beyond the temperature reduction specified by the expansion. This improves the thermodynamic efficiency of the turbine.

That condition which would be present without the provision of cooling gas flows is essentially produced in the turbine by the additional combustion of fuel. In the case where the cooling gas flow consists essentially of air, the fuel is admixed to a proportion by weight of a maximum of 2% of the cooling gas flow. With this mixing ratio, an unintentional ignition of the mixture of air and fuel is essentially excluded, in particular when the fuel is homogeneously mixed into the cooling gas flow.

SUMMARY OF THE INVENTION

An object of an embodiment of the invention is to provide a gas turbine in which, with comparatively little complication, a particularly high efficiency, a high specific power and particularly low emissions of oxides of nitrogen are achieved. A further object of an embodiment of the invention is to provide a corresponding method for operating a gas turbine.

According to an embodiment of the invention, the object directed toward a gas turbine may be achieved by a gas turbine having a compressor for generating a compressed combustion air flow which flows along a flow direction, a hot-gas region, comprising a combustion chamber and a turbine part with a hot gas flow duct, and a cooling air supply system for branching off a cooling air flow from the combustion air flow at a branch position and supplying it to a thermally stressed hot gas component of the hot gas region, a fuel supply device being provided for the supply of fuel to the combustion air flow at a fuel supply position and the fuel supply position being arranged, in the flow direction, before the branch position.

An embodiment of the invention therefore pursues the unusual path of not specifically admixing fuel to the combustion air flow only in a cooling air flow which has already been branched off and which only has to flow over a comparatively short distance to the turbine part but, rather, of admixing the fuel before the cooling air flow is branched off. This leads, at first glance, to an inappropriate flow of a fuel/combustion air mixture through the whole of the cooling air supply system. On this point, an embodiment of the invention is based on the recognition that the risk of self-ignition of such a mixture can actually be controlled in the region of the cooling air supply system. In contrast to the dominant opinion, it is possible, according to the recognition by an embodiment of the invention and taking account of ignition temperatures and ignition delay periods of the mixture occurring in the cooling air supply system, to practically exclude any self-ignition. This possibility, which has never been seriously considered in the prior art, offers a series of advantages.

In conventional technology, the cooling air flowing into the cooling air supply system is lost in terms of the actual gas turbine process for the generation of mechanical energy because it is only used for the cooling of highly stressed components and does not participate in the combustion process. The admixture of fuel to the cooling air makes it possible to permit the combustion of the cooling air flow, which is mixed with fuel, after cooling has taken place in the hot gas region of the gas turbine. By this, work is also performed by the cooling air flow and the efficiency of the gas turbine increases. At the same time, however, the ISO temperature of the gas turbine does not increase when, for example, using the cooling air flow for cooling a gas turbine blade/vane. The ISO temperature is the hypothetical, computational turbine inlet temperature of a cooled gas turbine. It is smaller than the combustion temperature which is present in the primary zone of the combustion chamber. The difference between the combustion temperature and ISO temperature increases with the cooling air quantity which, in turn, increases with the ISO temperature. Typical ISO temperatures of large stationary gas turbines are located at about 1200° C., whereas the combustion temperatures are located at approximately 1400° C. A high efficiency and a high specific power of the gas turbine demands the smallest possible difference between combustion temperature and ISO temperature. There is, therefore, a great incentive to increase the ISO temperature at a given combustion temperature or to reduce the combustion temperature at a given ISO temperature.

The combustion temperature is determined by the ratio between the fuel quantity and the combustion air quantity.

The cooling air quantity is branched off from the combustion air flow. In conventional technology, therefore, the residual combustion air quantity is equal to the air quantity, induced by the compressor, less the cooling air quantity. A first possibility for reducing the ratio between the fuel quantity and the combustion air quantity is to increase the combustion air quantity by reducing the cooling air quantity. In conventional technology, therefore, every attempt is made to manage with the smallest possible cooling air quantity. The potential from this procedure is, however, limited. Given optimally designed cooling air systems, direct savings in cooling air are scarcely still possible and increase the risk of components overheating.

A second possibility for reducing the ratio between fuel quantity and combustion air quantity is to reduce the fuel quantity burnt in the combustion chamber. Because the fuel quantity is dictated by the power to be operated, this is only possible if some of the fuel is transferred from the combustion air flow flowing into the combustion chamber to other suitable additional combustion air flows and is burnt, not in the combustion chamber but thermodynamically favorably at a high temperature level—if possible before the expansion in the turbine part. This is realized by an embodiment of the invention because the fuel is admixed before the cooling air flow is branched off and is burnt in the hot gas region of the gas turbine after the cooling of the hot gas component.

In addition to a high efficiency and a high gas turbine specific power, a further very important requirement is a low level of pollutant production, low emission is of oxides of nitrogen being especially important. The occurrence of oxides of nitrogen is exponentially associated with an increasing flame temperature. In the case of an inhomogeneous temperature distribution in a combustion zone, the emission of oxides of nitrogen is essentially determined by the maximum temperatures. Efforts are therefore made to achieve a temperature distribution which is as homogeneous as possible. This may, in particular, be achieved by an extensive mixing of fuel and combustion air.

In gas turbines of conventional type, the essential part of the fuel is only admixed to the combustion air on entry into the combustion chamber. Given the high flow velocities, a relatively short mixing section is present so that fuel and combustion air do not mix in an optimally homogeneous manner. A similar problem exists in the case of the known supply of fuel to individual cooling air flows shortly before the flow into the turbine part. Measures are often taken to homogenize the fuel/combustion air mixture by more intensive mixing. These measures, however, are fundamentally based on the generation of a high level of turbulence in the combustion air flow and they all, therefore, cause an additional pressure loss in the cooling air flow.

In contrast, very good mixing of fuel and combustion air is achieved by way of an embodiment of the invention because a large mixing section is achieved, without arranging additional mixers in the cooling air flow for this purpose. There is, therefore, no additional pressure loss.

The fuel supply device is preferably designed in such a way that at least 80% of a fuel mass flow being burnt in total per unit time can be supplied by means of the fuel supply device. The major part of the fuel to be burnt in the gas turbine has already, therefore, been admixed to the combustion air flow before the branch position. In the case of previous measures for cooling air reheat, as already stated above, fuel was only supplied after the branching of the cooling air flow in the region of the turbine part.

In addition, the fuel metering has hitherto been kept to very small dimensions in order to exclude the risk of self-ignition. In the present case, the cooling air flow has already been enriched with fuel to such an extent that the result is a mixture comparable with the mixture turning in the combustion chamber.

This upstream supply of the essential part of the fuel supply compared with conventional embodiments means that the design of the gas turbine burners arranged in the combustion chamber is reduced, as it were, to producing an appropriate, canalized opening. The supply of fuel, therefore, no longer takes place in the burner but, where appropriate, substantially before the burner, viewed in the flow direction. This leads to an improved mixing of fuel and combustion air before entry into the combustion chamber. The burner is now essentially used for flame-holding by way, say, of a suitably designed swirl cascade. A pilot burner, which is used for the stabilization of a lean premixing combustion, can be additionally provided. However, an essentially smaller proportion of the fuel to be burnt in total is supplied to the pilot burner.

The fuel supply device is preferably connected to a fuel reservoir for a gaseous fuel, in particular methane. The ignition temperature and the ignition delay period of the gaseous fuel, and methane in particular, are especially suitable for early mixing into the combustion air flow before the cooling air flow is branched off. Comprehensive laboratory tests on the self-ignition behavior of methane/air mixtures have demonstrated that the risk of self-ignition is practically excluded, despite the early admixture of the fuel. If necessary, the ignition temperature and/or the ignition delay period also can be further favorably influenced by admixing long-chain hydrocarbons. The hot gas component is preferably a turbine blade/vane, a guide vane or a rotor blade being further preferred. In a further preferred design, the rotor blade is part of a first guide vane row, viewed in the flow direction, in the hot gas flow duct or the rotor blade is part of a first rotor blade row, viewed in the flow direction, in the hot gas flow duct. It is precisely the first guide vane row which is subjected to particularly high thermal stresses due to the still very high temperatures of the hot gas emerging from the combustion chamber. A particularly high cooling air quantity must accordingly be used in order to cool this guide vane row.

Corresponding conditions also apply to the first rotor blade row. Now that fuel is admixed to the cooling air used for this cooling operation, its emergence into the hot gas flow duct can be additionally used, after cooling has taken place, for reheat purposes. This combustion process ignites spontaneously due to the high temperatures in the hot gas flow duct. The cooling air is therefore not only used for cooling purposes but also takes part in the work process of the gas turbine.

The hot gas component is preferably a wall segment of an inner lining of the combustion chamber. Such a wall segment can, for example, be a ceramic combustion chamber brick. Due to the high thermal stress, the inner lining of a gas turbine must also be cooled. The admixture of fuel to this cooling air means that the cooling air emerging into the combustion chamber is also used for the combustion process. Because this combustion takes place in the wall region of the combustion chamber and not in its primary zone, this additional combustion does not lead to an increase in the combustion temperature. The energy input into the combustion chamber, and therefore the turbine inlet temperature, is nevertheless increased.

The fuel supply position is preferably located in the compressor and additional preference is given to the fuel supply device in this arrangement comprising a compressor guide vane. The fuel supply devic which can, for example, also comprise a fuel pump, therefore has, in its outlet region, a compressor guide vane through which the fuel passes into the compressed combustion air flow.

According to an embodiment of the invention, the object directed toward a method may be achieved by a method for operating a gas turbine having a compressor and a hot gas region, comprising a combustion chamber and a turbine part with a hot gas flow duct, in which a compressed combustion air flow flowing along a flow direction is generated in the compressor, fuel is supplied to the combustion air flow at a fuel supply position, a cooling air flow is branched off from the combustion air/fuel mixture generated in this way, the cooling air flow is supplied to a thermally highly stressed hot gas component arranged in the hot gas region.

The advantages of such a method follow correspondingly from the above statements and the advantages of the gas turbine.

Methane is preferably used as the fuel. The admixture of long-chain hydrocarbons to the methane is also preferred.

A guide vane of a first guide vane row, viewed in the flow direction, of the turbine part is preferably cooled by the cooling air flow.

A rotor blade of a first rotor blade row, viewed in the flow direction, of the turbine part is preferably cooled by the cooling air flow.

In a preferred design, the supply of the fuel to the combustion air flow takes place by way of a compressor guide vane and, as a further preference, by way of a compressor guide vane of a last guide vane row, viewed in the flow direction, of the compressor.

At least 80% of a fuel mass flow being burnt, in total, per unit time is preferably supplied to the combustion air flow at the fuel supply position.

All the preferred designs of the invention, as listed above, can also be combined with one another in all combinations, i.e. they can be employed jointly. Preference is particularly given to a plurality of cooling air supply systems being provided for cooling a plurality of hot gas components, in particular to the first guide vane row and rotor blade row and of the combustion chamber. The fuel supply described for the cooling air preferably takes place in the case of at least 50% of the total cooling air quantity used, in total, for cooling the gas turbine.

BRIEF DESCRIPTION OF THE DRAWINGS

The invention is explained in more detail in an exemplary embodiment. The single FIGURE shows, in a longitudinal section, diagrammatically and not to scale, a gas turbine 3.

DETAILED DESCRIPTION OF THE PREFERRED EMBODIMENTS

A compressor 7, a combustion chamber 9 and a turbine part 11 are arranged sequentially along an axis 5. The compressor 7 and the turbine part 11 are arranged on a common rotor 13. The compressor 7 is connected to the combustion chamber 9 by way of a combustion air duct 15. The combustion air duct 15 is connected to a cooling air supply system 19 at a branch position 17. The cooling air supply system 19 includes a first cooling air duct 20, from which a first secondary cooling air duct 21 and a second secondary cooling air duct 23 branch off.

The first secondary cooling air duct 21 is connected to a hollow guide vane 25 of a guide vane row 28 of the turbine part 11. The guide vane row 28 is a first guide vane row 28, viewed in the flow direction, of the turbine part 11. The second cooling air duct 23 is connected to a rotor blade 27 of a rotor blade row 30 of the turbine part 11. The rotor blade row 30 is a first rotor blade row 30, viewed in the flow direction, of the turbine part 11. The guide vane row 28 and the rotor blade row 30 are arranged in a hot gas flow duct 26 of the turbine part 11. The rotor blade row 30 is connected to the rotor 13, whereas the guide vane row 28 is connected to the casing of the turbine part 11. The turbine part 11 has further guide vane rows and rotor blade rows which, however, for ease of understanding, are not Sequentially following guide vane rows and rotor blade rows are likewise arranged in the compressor 7, only one last rotor blade row 32 and one last guide vane row 36 being shown in this case. The guide vane row 36 has a hollow compressor guide vane 35, which is connected to a fuel reservoir 31 via a main fuel conduit 33. A main fuel pump 40A is arranged in the main fuel conduit 33. The main fuel conduit 33, the main fuel pump 40A and the compressor guide vane 35 are part of a fuel supply device 37. Fuel can be released from the hollow compressor guide vane 35 through openings at a fuel supply position 38 defined by this.

The fuel reservoir 31 is connected to the pilot burner 41 via a secondary fuel conduit 39, in which a secondary fuel pump 40B is arranged. The pilot burner 41 is concentrically surrounded by a premixing combustion duct 42. A swirl cascade 43 is arranged in the premixing combustion duct 42. The premixing combustion duct 42 opens into the combustion chamber 9. It is open to the combustion air duct 15 at its end remote from the combustion chamber 9. The combustion chamber 9 has an inner lining 51. This inner lining 51 is formed from wall segments 53, of which only one is shown as an example. The inner lining 51 is mounted on a support structure 52 of the combustion chamber 9. An intermediate space 54 remains between the support structure 52 and the inner lining 51.

During operation of the gas turbine 3, ambient air is induced as compressor air 61 by the compressor 7 and is highly compressed. The air flow compressed in this manner is conducted as a combustion air flow 61 along a flow direction 62 into the combustion air duct 15. Fuel 63 is conducted to the compressor guide vane 35 from the fuel reservoir 31 via the main fuel conduit 33, by use of the main fuel pump 40A. The fuel 63 emerges from openings 64 in the compressor guide vane 35 and into the combustion air flow 61. In the combustion air flow 61, the fuel 63 mixes well with the combustion air of the combustion air flow 61 along the combustion air duct 15. The combustion air flow 61 is then branched:

A first part of the combustion air flow 61 is conducted, as the cooling air flow 65A, to the branch position in the cooling air supply system 19. A second part of the combustion air flow 61 is conducted, as the cooling air flow 65B, into the intermediate space 54 of the combustion chamber 9. The cooling air flow 65, which is conducted in this way in a plurality of branches, is used for cooling thermally highly stressed hot gas components 53, 25, 27 of the part of the gas turbine 3 forming the hot gas region 12, this part comprising the combustion chamber 9 and the turbine part 11. The cooling air flow 65A is supplied to the guide vane 25 via the first secondary cooling air duct 21, which guide vane 25 has a hollow configuration. The cooling air flow 65A flowing into the hollow guide vane 25 emerges via openings into the hot gas flow duct 26 of the turbine part 11. A part of the cooling air flow 65A is correspondingly supplied via the second secondary cooling air duct 23 to the rotor blade 27, which has a hollow embodiment, and emerges from the latter via openings, likewise into the hot gas flow duct 26. The cooling air flow 65B conducted in the intermediate space 54 of the combustion chamber 9 emerges via openings in the inner lining 51 into the combustion chamber 9 after cooling this inner lining 51.

The major part of the combustion air flow 61 is supplied to the premixing duct 42, by which it enters the combustion chamber 9.

The admixture of the fuel 63 to the combustion air flow 61 by means of the fuel supply device 37 at the fuel supply position 38 leads to this cooling air flow 65 being mixed with fuel 63 because the branching of the cooling air flow 65—in the form of the cooling air partial flows 65A and 65B—only occurs later, viewed in the flow direction. In this arrangement, the major part of the fuel 63 to be burnt by the gas turbine 3 per unit time has already been supplied via the fuel supply device 37. By corresponding design of the fuel supply duct 33, the main fuel pump 40A and the compressor guide vane 35, the fuel supply device 37 is configured to supply these large fuel quantities. The fuel/air mixture of the combustion air flow 61 supplied to the primary combustion therefore has the same mixture as the cooling air flow 65. Cooling by use of a cooling air flow 65, which has an ignitable mixture similar to the mixture supplied to the actual combustion in the primary zone of the combustion chamber 9, is an unusual and—at first glance—inappropriate measure because the result of self-ignition in the cooling air flow 65 appears to be substantial damage, extending to complete destruction, of the gas turbine 3.

Astonishingly, however, it is precisely the use of methane as the fuel 63 which makes the ignition temperature so high and, simultaneously, an ignition delay period so long that the risk of self-ignition is excluded. It is therefore possible to use a substantial part of the total cooling air quantity used for cooling the gas turbine 3, preferably at least half of this total cooling air quantity, for both cooling and combustion, because the cooling flow 65 emerging into the combustion chamber 9 and into the hot gas flow duct 26 ignites spontaneously and burns there because of the high temperatures. This raises both the specific power and the efficiency of the gas turbine 3. In addition, there is very good mixing of the fuel 63 with the combustion air flow 61 due to the long mixing section occurring in the combustion air duct 15. The result of this is a substantial reduction in emissions of oxides of nitrogen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas turbine, comprising:
    a compressor for generating a compressed combustion air flow which flows along a flow direction;
    a hot-gas region, including a combustion chamber and a turbine part with a hot gas flow duct; and
    a cooling air supply system for branching off a cooling air flow from the combustion air flow at a branch position and supplying it to a thermally stressed hot gas component of the hot gas region;
    wherein a fuel supply device is provided for the supply of fuel to the combustion air flow at a fuel supply position;
    wherein the fuel supply position is arranged, viewed in the flow direction, before the branch position;
    wherein the fuel and the cooling air flow are branched directly adjacent a pilot burner into at least two cooling passages inclusive of a first cooling passage and a second cooling passage, the first cooling passage delivering fuel and cooling air flow to the hot gas component; and
    wherein the cooling air supply system directs at least a portion of the cooling air flow mixed with fuel from the fuel supply device along an inner lining of the combustion chamber via the second cooling passage, through openings in the inner lining, and into the combustion chamber in which the cooling air flow mixed with fuel self-ignites.

2. The gas turbine as claimed in claim 1, wherein the fuel supply device is designed in such a way that at least 80% of a fuel mass flow being burnt in total per unit time is suppliable via the fuel supply device.

3. The gas turbine as claimed in claim 2, wherein the fuel supply device is connected to a fuel reservoir for a gaseous fuel.

4. The gas turbine as claimed in claim 2, wherein the hot gas component is a turbine blade/vane.

5. The gas turbine as claimed in claim 1, wherein the fuel supply device is connected to a fuel reservoir for a gaseous fuel.

6. The gas turbine as claimed in claim 5, wherein the hot gas component is a turbine blade/vane.

7. The gas turbine as claimed in claim 1, wherein the hot gas component is a turbine blade/vane.

8. The gas turbine as claimed in claim 7, wherein the hot gas component is a guide vane.

9. The gas turbine as claimed in claim 8, wherein the hot gas component is a guide vane of a first guide vane row, viewed in flow direction, in the hot gas flow duct.

10. The gas turbine as claimed in claim 8, wherein the hot gas component is a rotor blade of a first rotor blade row, viewed in flow direction, in the hot gas flow duct.

11. The gas turbine as claimed in claim 1, wherein the inner lining of the combustion chamber has a wall segment.

12. The gas turbine as claimed in claim 1, wherein the fuel supply position is located in the compressor.

13. The gas turbine as claimed in claim 12, wherein the fuel supply device comprises a compressor guide vane.

14. The gas turbine as claimed in claim 13, wherein the compressor guide vane is part of a last compressor guide vane row, viewed in flow direction.

15. The gas turbine as claimed in claim 1, wherein the fuel supply device is connected to a fuel reservoir for methane.

16. A method for operating a gas turbine having a compressor and a hot gas region, comprising a combustion chamber and a turbine part with a hot gas flow duct, the method comprising:
    generating a compressed combustion air flow flowing along a flow direction, in the compressor;
    supplying fuel to the combustion air flow at a fuel supply position to produce a combustion air/fuel mixture;
    branching a cooling air flow off from the combustion air/fuel mixture; and
    supplying the cooling air flow to a thermally highly stressed hot gas component arranged in the hot gas region;
    wherein the fuel and the cooling air flow are branched directly adjacent a pilot burner into at least two cooling passages inclusive of a first cooling passage and a second cooling passage, the first cooling passage delivering fuel and cooling air flow to the hot gas component; and wherein at least a portion of the cooling air flow is supplied along an inner lining of the combustion chamber via the second cooling passage, through openings in the inner lining, and into the combustion chamber in which the cooling air flow self-ignites.

17. The method as claimed in claim 16, wherein methane is used as the fuel.

18. The method as claimed in claim 16, wherein long-chain hydrocarbons are admixed to the fuel.

19. The method as claimed in claim 16, wherein a guide vane of a first guide vane row, viewed in flow direction, of the turbine part is cooled by the cooling air flow.

20. The method as claimed in claim 16, wherein a rotor blade of a first rotor blade row, viewed in flow direction, of the turbine part is cooled by the cooling air flow.

21. The method as claimed in claim 16, wherein the supply of the fuel to the combustion air flow takes place via a compressor guide vane.

22. The method as claimed in claim 21, wherein the supply of the fuel to the combustion air flow takes via a compressor guide vane of a last guide vane row, viewed in flow direction, of the compressor.

23. The method as claimed in claim 16, wherein at least 80% of a fuel mass flow being burnt, in total, per unit time is supplied to the combustion air flow at the fuel supply position.

24. A gas turbine, comprising:

compressor means for generating a compressed combustion air flow which flows along a flow direction;

a hot-gas region, including a combustion chamber and a turbine part with a hot gas flow duct;

cooling air supply means for branching off a cooling air flow from the combustion air flow at a branch position and supplying it to a thermally stressed hot gas component of the hot gas region; and fuel supply means for the supply of fuel to the combustion air flow at a fuel supply position;

wherein the fuel supply position is arranged, viewed in the flow direction, before the branch position;

wherein the fuel and the cooling air flow are branched directly adjacent a pilot burner into it least two cooling passages inclusive of a first cooling passage and a second cooling passage, the first cooling passage delivering fuel and cooling air flow to the hot gas component; and wherein the cooling air supply means directs at least a portion of the cooling air flow mixed with fuel from the fuel supply means along an inner lining of the combustion chamber via the second cooling passage, through openings in the inner lining, and into the combustion chamber in which the cooling air flow mixed with fuel self-ignites.

25. The gas turbine as claimed in claim 24, wherein the fuel supply means is designed in such a way that at least 80% of a fuel mass flow being burnt in total per unit time is suppliable via the fuel supply device.

26. The gas turbine as claimed in claim 24, wherein the fuel supply means is connected to a fuel reservoir for a gaseous fuel.

27. The gas turbine as claimed in claim 24, wherein the hot gas component is a turbine blade/vane.

28. The gas turbine as claimed in claim 24, wherein the hot gas component is a guide vane.

29. The gas turbine as claimed in claim 28, wherein the hot gas component is a guide vane of a first guide vane row, viewed in flow direction, in the hot gas flow duct.

30. The gas turbine as claimed in claim 27, wherein the hot gas component is a rotor blade of a first rotor blade row, viewed in flow direction, in the hot gas flow duct.

* * * * *